UNITED STATES PATENT OFFICE.

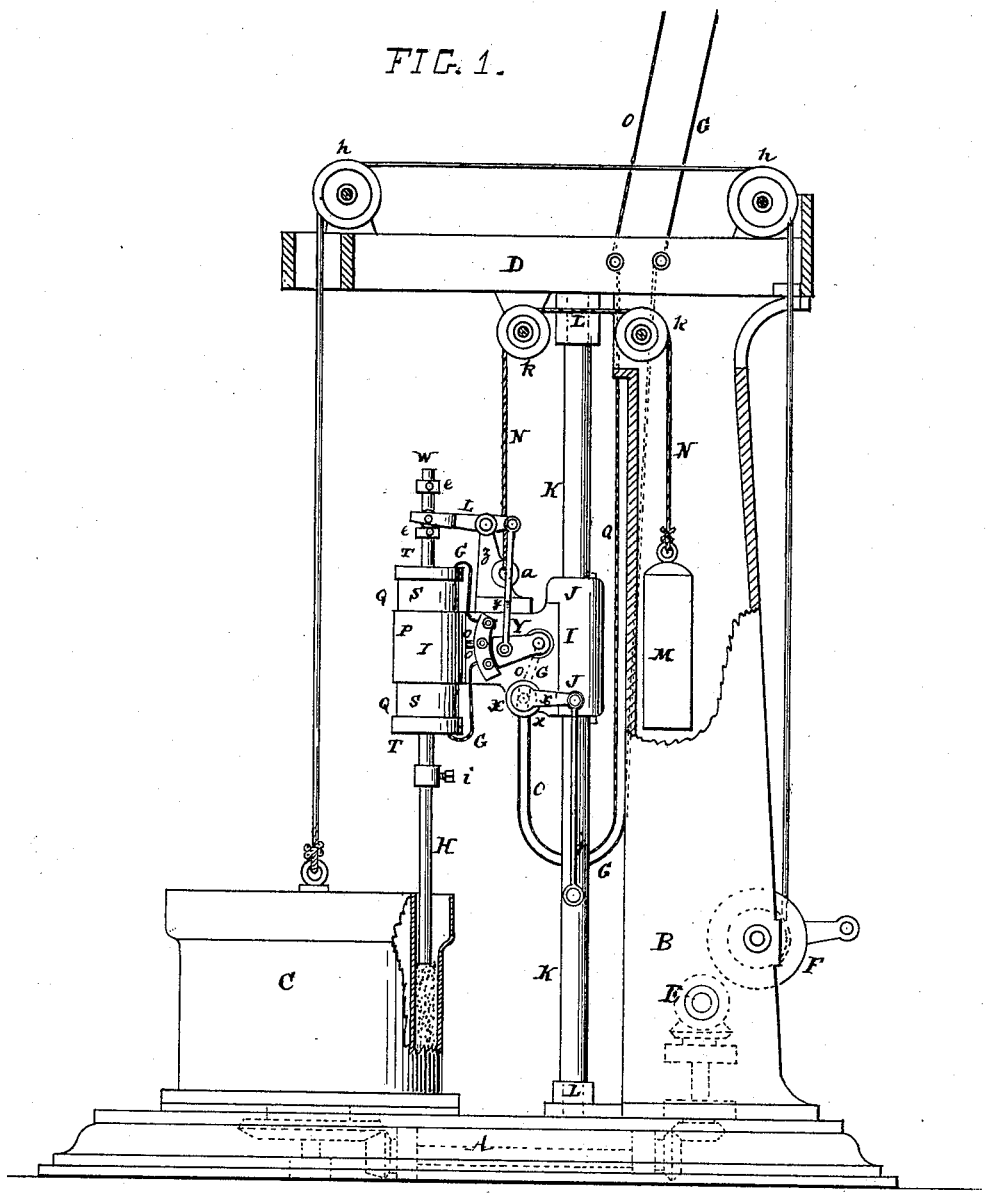

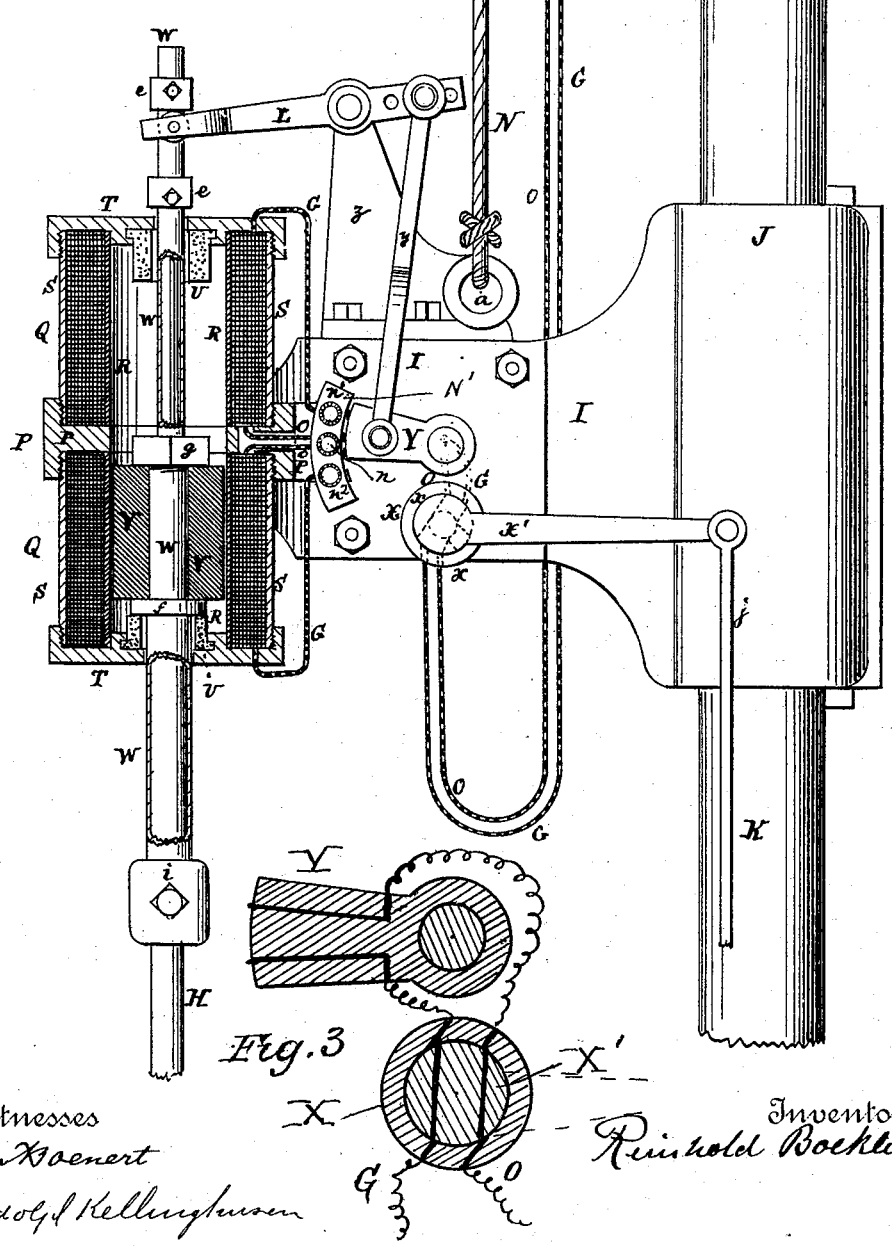

REINHOLD BOEKLEN, OF OMAHA, NEBRASKA, ASSIGNOR TO JEFF W. BEDFORD, OF SAME PLACE.

ELECTRICALLY-OPERATED MACHINE FOR MOLDING CLAY OR CEMENT PIPES.

SPECIFICATION forming part of Letters Patent No. 507,671, dated October 31, 1893.

Application filed July 30, 1891. Serial No. 401,175. (No model.)

*To all whom it may concern:*

Be it known that I, REINHOLD BOEKLEN, a citizen of the United States, residing at the city of Omaha, in the county of Douglas and State of Nebraska, have invented a new and useful Improvement in Machines for Molding Clay and Cement Pipes, of which the following is a specification.

My invention relates to improvements in machines for making cement sewer pipes, of that class or description in which is employed a rotatable mold in connection with a vertically reciprocating rammer carried by a vertically movable head.

The object of the invention is to provide improved means for reciprocating the rammer, whereby I secure superior advantages with respect to economy and efficiency in operation.

The invention consists in the novel construction and combination of parts hereinafter fully described and claimed.

In the accompanying drawings: Figure 1 represents a sectional side elevation of a machine for making sewer pipe, with my improvements applied thereto. Fig. 2 is a detail sectional elevation of the rammer-stock on an enlarged scale. Fig. 3 is a detail sectional view of the switch.

In the said drawings, the reference letter A designates the usual hollow bed plate of the machine provided at its rear end with a column or upright B and at its front end with a rotatable mold C. On the top of said column is a horizontal arm D. The mold is guided in the bed-plate A, and is rotated by gearings in the bed-plate and column, from a driving-shaft E, as usual in this class of machines.

For raising the core out of the mold I employ a windlass with a winding drum F, guide pulleys $h$, $h$, being provided, over which the pull rope passes, as heretofore.

The letter H designates the rammer which reciprocates in the pipe space of the mold.

The letter I designates the rammer stock or head, having a hub J, slidable upon a vertical arbor or shaft K, held in fixed bearings L secured to stationary parts of the machine. By means of a vertical groove in said shaft, and a key carried by the hub engaging therewith, the hub is prevented from rotating thereon.

The letter M designates a counter-balance weight connected with said stock by a rope N, passing over pulleys $k$, $k$.

The above parts form no part of my present invention, which relates to the peculiar construction and means for operating the rammer.

Secured to or forming part of the rammer stock is a ring or extension consisting of a circular plate P, having a central aperture and formed with annular flanges P', P', on its top and bottom. Secured to these flanges, which are screw-threaded, are upwardly and downwardly extending brass tubes S, connected at their outer ends with heads T, T, having central holes or openings for the passage of the rammer bar W. It will thus be seen that two compartments are formed vertically aligned with each other, in each of which is located a magnetic coil Q, which surrounds the soft iron cores R. These coils are separate and distinct from each other and the ends of the upper coil are connected with binding posts $n$, $n'$, and the ends of the lower coil connected with binding posts $n$ and $n^2$. These binding posts are secured to a segment plate N', of non-conducting material secured to the rammer-stock and the ends of the wires of the coil project slightly beyond the rear thereof, so as to contact with the conductors hereinafter described of an oscillating switch-plate Y, during the movement of the latter. This switch-plate which is of non-conducting material, is pivoted to the rammer-stock, and is connected by a vertical bar $y$, with a lever L pivoted to said stock. The opposite end of this lever is bifurcated and adapted to engage alternately with collars $e$, $e$, on the rammer bar W, so that as the latter reciprocates up and down the lever will be vibrated and the switch-plate oscillated. This switch-plate is provided with positive and negative conductors with a circuit breaker X', consisting of an oscillatory arm of non-conducting material journaled in a boss X, of similar material. Passing through this arm are two conductors adapted to contact with the positive and negative conductors O and G, leading to a dynamo or other source of electric energy, and also with the conductors Y', Y².

Secured to the bar W is a soft iron cylinder or core V, and each of the heads T, is provided with a rubber cushion v to take up the jar of said core as the latter reciprocates.

The operation is as follows: In the position shown in Fig. 2, the switch plate is in contact with the wires of the upper coil and a circuit is established through conductors O and G, with the upper coil, thus magnetizing the latter and causing core V and the rammer bar to be elevated. As said bar reaches the end of its stroke, lever L will be vibrated depressing rod y and turning switch-plate Y on its pivot, breaking the circuit with said upper coil and throwing the lower coil into circuit, which will attract core V and depress the rammer bar. By means of lever j, the circuit breaker X', can be rotated to break the circuit between the switch-plate and dynamo.

Having thus described my invention, what I claim is—

1. The combination with the vertically movable rammer-stock, of the extensions or perforated plate having annular screw-threaded flanges and a central opening, the top and bottom heads, the tubes connected therewith, the inner cores of soft iron, the coils located between said cores and tubes, the rammer-bar and its soft iron cylinder or core, and means for alternately making and breaking the circuit to said coils, substantially as described.

2. The combination with the vertically movable rammer-stock, having an extension or perforated plate provided with a central opening and annular flanges on its top and bottom, the end heads, the tubes connected therewith, the soft iron cores, the rammer stock having a soft iron cylinder or core and the coils located between said cores and tubes, of the segment plate provided with binding posts to which said coils are connected, the oscillating switch-plate provided with conductors adapted to engage or contact with the ends of said coils, the rotating circuit breaker, the rod connected with said switch plate and the pivoted lever connected with the rammer-bar, substantially as described.

REINHOLD BOEKLEN.

Witnesses:
ANTON BOENER,
RUDOLPH KELLINGHUSEN.